(12) United States Patent
McNab et al.

(10) Patent No.: US 9,939,341 B2
(45) Date of Patent: Apr. 10, 2018

(54) PIPELINE APPARATUS AND METHOD

(71) Applicant: GE Oil & Gas UK Limited, Nailsea, Bristol (GB)

(72) Inventors: John Cross McNab, Newcastle-upon-Tyne (GB); Geoffrey Stephen Graham, Newcastle-upon-Tyne (GB); Philip Michael Hunter Nott, Newcastle-upon-Tyne (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 55 days.

(21) Appl. No.: 15/029,571

(22) PCT Filed: Oct. 23, 2014

(86) PCT No.: PCT/GB2014/053158
§ 371 (c)(1),
(2) Date: Apr. 14, 2016

(87) PCT Pub. No.: WO2015/063457
PCT Pub. Date: May 7, 2015

(65) Prior Publication Data
US 2016/0266001 A1    Sep. 15, 2016

(30) Foreign Application Priority Data

Oct. 29, 2013   (GB) .................................. 1319105.1

(51) Int. Cl.
*G01M 3/18*      (2006.01)
*G01M 3/38*      (2006.01)

(52) U.S. Cl.
CPC .............. *G01M 3/182* (2013.01); *G01M 3/18* (2013.01); *G01M 3/38* (2013.01)

(58) Field of Classification Search
CPC .......... G01M 3/00; G01M 3/18; G01M 3/182; G01M 3/38
See application file for complete search history.

(56) References Cited

U.S. PATENT DOCUMENTS 4,029,889 A * 6/1977 Mizuochi .............. G01M 3/045
                                                   138/104
4,446,892 A    5/1984 Maxwell
(Continued)

FOREIGN PATENT DOCUMENTS

CN      102221440 A    10/2011
EP       2063068 A1     5/2009
(Continued)

OTHER PUBLICATIONS

International Search Report and Written Opinion of the International Searching Authority, dated Feb. 5, 2015, for corresponding International Application No. PCT/GB2014/053158, 12 pages.
(Continued)

*Primary Examiner* — Nguyen Ha
*Assistant Examiner* — Wyn Ha
(74) *Attorney, Agent, or Firm* — Klarquist Sparkman, LLP (57) ABSTRACT

A pipeline apparatus comprising a flexible pipe body and a detection apparatus. The flexible pipe body includes an optical fiber extending at least partially along the length of the flexible pipe body, the optical fiber being encased in a metal tube. The detection apparatus comprises an optical sensor and an electrical sensor. The optical sensor is coupled to a first end of the optical fiber, the optical sensor being arranged to inject optical pulses into the optical fiber and to detect scattered or reflected light. The electrical sensor is coupled to a first end of the metal tube and to detect variation of an electrical impedance between the first end of the metal tube and a separate terminal. Variation of the scattered or (Continued)

reflected light, or impedance variation, is indicative of a potential pipe body defect.

11 Claims, 6 Drawing Sheets

(56) References Cited

U.S. PATENT DOCUMENTS

| | | | |
|---|---|---|---|
| 5,177,996 A | | 1/1993 | Sahakian |
| 5,551,484 A | | 9/1996 | Charboneau |
| 6,004,639 A | * | 12/1999 | Quigley ............... B29C 70/086 138/125 |
| 7,805,248 B2 | | 9/2010 | Thigpen et al. |
| 8,087,430 B1 | * | 1/2012 | Betz ...................... F16L 11/12 138/104 |
| 8,789,562 B2 | * | 7/2014 | Kagoura ............. F16L 11/081 138/104 |
| 9,400,227 B2 | * | 7/2016 | Ramos .................. G01M 3/002 |
| 9,587,773 B2 | * | 3/2017 | Nokkentved ......... F16L 11/088 |
| 2009/0115433 A1 | * | 5/2009 | Bier ....................... G01M 3/18 324/693 |
| 2011/0017337 A1 | | 1/2011 | Kagoura |
| 2012/0098555 A1 | * | 4/2012 | Raymond ............. G01M 3/165 324/694 |
| 2013/0154666 A1 | | 6/2013 | Albaladejo et al. |
| 2014/0069542 A1 | * | 3/2014 | Graham ................ G01M 3/40 138/104 |

FOREIGN PATENT DOCUMENTS

| | | |
|---|---|---|
| EP | 2273172 A1 | 1/2011 |
| EP | 2565370 A1 | 3/2013 |
| EP | 2706338 A1 | 3/2014 |
| EP | 2725186 A1 | 4/2014 |
| GB | 2473201 A | 3/2011 |
| JP | H0443934 A | 2/1992 |
| WO | WO1999/19653 | 4/1999 |
| WO | WO2010/118342 A1 | 10/2010 |
| WO | WO2011/143384 A1 | 11/2011 |
| WO | WO2013/093068 A1 | 6/2013 |
| WO | WO2013/135244 A1 | 9/2013 |

OTHER PUBLICATIONS

Smolen and van der Spek, *Distributed Temperature Sensing, A DTS Primer for Oil & Gas Production,* Shell International Exploration and Production B.V, The Hague, The Netherlands, May 2003, 97 pages.

Search Report of the United Kingdom Intellectual Property Office, dated Apr. 2, 2014, for corresponding United Kingdom Application No. GB1319105.1, 4 pages.

International Preliminary Report on Patentability and Written Opinion of the International Searching Authority, dated May 12, 2016, for corresponding International Application No. PCT/GB2014/053158, 9 pages.

Office Action (including English Translation) from The State Intellectual Property Office of China, for Chinese Patent Application No. 201480059920.9, dated Feb. 24, 2018, 22 pages.

* cited by examiner

PIPELINE APPARATUS AND METHOD

CROSS REFERENCE TO RELATED APPLICATIONS

This is the U.S. National Stage of International Application No. PCT/GB2014/053158, filed Oct. 23, 2014, which in turn claims the benefit of and priority to Great Britain Application No. GB1319105.1, filed Oct. 29, 2013.

The present invention relates to a pipeline apparatus and method. In particular, the present invention relates to a pipeline apparatus comprising a flexible pipe body and a detection apparatus and method for detecting potential defects within the flexible pipe body. Particular embodiments relate to a method of forming such a pipeline apparatus.

Traditionally, flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The flexible pipe may have an internal diameter of typically up to around 0.6 meters. Flexible pipe is generally formed as an assembly of a flexible pipe body and one or more end fittings. The flexible pipe body is typically formed as a combination of layered materials that form a pressure-containing conduit. The pipe structure allows large deflections without causing bending stresses that impair the flexible pipe's functionality over its lifetime. The pipe body is generally built up as a combined structure including metal and polymer layers.

In many known flexible pipe designs the pipe body includes one or more pressure armour layers. The primary load on such layers is formed from radial forces. Pressure armour layers often have a specific cross section profile to interlock so as to be able to maintain and absorb radial forces resulting from outer or inner pressure on the pipe. The cross sectional profile of the wound wires which thus prevent the pipe from collapsing or bursting as a result of pressure are sometimes called pressure-resistant profiles. When pressure armour layers are formed from helically wound wire forming hoop components, the radial forces from outer or inner pressure on the pipe cause the hoop components to expand or contract, putting a tensile load on the wires.

In many known flexible pipe designs the pipe body includes one or more tensile armour layers. The primary loading on such a tensile armour layer is tension. In high pressure applications, such as in deep and ultra deep water environments, the tensile armour layer experiences high tension loads from a combination of the internal pressure end cap load and the self-supported weight of the flexible pipe. This can cause failure in the flexible pipe since such conditions are experienced over prolonged periods of time.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example, in such deep and ultra-deep water environments, ocean floor temperature increases the risk of production fluids cooling to a temperature that may lead to pipe blockage. Increased depths also increase the pressure associated with the environment in which the flexible pipe must operate. As a result the need for high levels of performance from the layers of the flexible pipe body is increased. Flexible pipe may also be used for shallow water applications (for example less than around 500 meters depth) or even for shore (overland) applications.

BACKGROUND

One way to improve the load response and thus performance of armour layers is to manufacture the layers from thicker and stronger and thus more robust materials. For example, for pressure armour layers in which the layers are often formed from wound wires with adjacent windings in the layer interlocking, manufacturing the wires from thicker material results in the strength increasing appropriately. However, as more material is used, the weight of the flexible pipe increases. Ultimately the weight of the flexible pipe can become a limiting factor in using flexible pipe. Additionally, manufacturing flexible pipe using thicker material increases material costs appreciably, which is a disadvantage.

Regardless of measures taken to improve the performance of armour layers within a pipe body, there remains a risk of defects arising within a flexible pipe. A defect may comprise damage to an outer wall of a flexible pipe body resulting in the ingress of seawater into an annulus within the pipe body such that seawater fills voids between the armour layer wires and other structural elements of the pipe. Armour layer wires and other structural elements are typically manufactured from steel or other metal materials, which are vulnerable to accelerated corrosion upon contact with seawater. If such a defect is not detected promptly then the structural integrity of the pipe body can be compromised. Detection of defects has previously often required visual inspection of the pipe body, which can be hazardous, particular for deep water and ultra-deep water installations.

SUMMARY

Certain embodiments of the invention provide the advantage that a potential defect within a pipe body can be detected without requiring periodic visual inspection. If a defect is present can then the pipe body can be repaired or replaced. Detectable defects include a breach of the outer wall of a flexible pipe and the ingress of seawater into a pipe body annulus.

According to a first aspect of the present invention there is provided a pipeline apparatus comprising: a flexible pipe body including an optical fibre extending at least partially along the length of the flexible pipe body, the optical fibre being encased in a metal tube; and a detection apparatus, the detection apparatus comprising: an optical sensor coupled to a first end of the optical fibre, the optical sensor being arranged to inject optical pulses into the optical fibre and to detect scattered or reflected light; and an electrical sensor coupled to a first end of the metal tube and to detect variation of an electrical impedance between the first end of the metal tube and a separate terminal; wherein variation of the scattered or reflected light, or impedance variation, is indicative of a potential pipe body defect.

According to a second aspect of the present invention there is provided a method of detecting defects within a flexible pipe body, the method comprising: injecting optical pulses into a first end of an optical fibre extending at least partially along the length of a flexible pipe body, the optical fibre being encased in a metal tube; detecting scattered or reflected light; detecting variation of an electrical impedance between the first end of the metal tube and a separate terminal; wherein variation of the scattered or reflected light, or impedance variation, is indicative of a potential pipe body defect.

According to a third aspect of the present invention there is provided a method of forming a pipeline apparatus, the method comprising: providing a flexible pipe body including an optical fibre extending at least partially along the length of a flexible pipe body, the optical fibre being encased in a metal tube; and coupling an optical sensor to a first end of the optical fibre; and coupling an electrical sensor to a first end of the metal tube; wherein the optical sensor is arranged to inject optical pulses into the optical fibre and to detect scattered or reflected light and the electrical sensor is arranged to detect variation of an electrical impedance between the first end of the metal tube and a separate terminal; and wherein variation of the scattered or reflected light, or impedance variation, is indicative of a potential pipe body defect.

There is further disclosed a detection apparatus arranged to detect defects within a flexible pipe body, the detection apparatus comprising: an optical sensor arranged to couple to a first end of an optical fibre extending at least partially along the length of a flexible pipe body, the optical fibre being encased in a metal tube, the optical sensor being arranged to inject optical pulses into the optical fibre and to detect scattered or reflected light; and an electrical sensor arranged to couple to a first end of the metal tube and to detect variation of an electrical impedance between the first end of the metal tube and a separate terminal; wherein variation of the scattered or reflected light, or impedance variation, is indicative of a potential pipe body defect.

Variation of scattered of reflected light may be indicative of a temperature variation along at least part of the length of the optical fibre.

The detection apparatus may further comprise a first processor coupled to the optical sensor and arranged to process the scattered or reflected light to calculate a temperature profile along the length of the optical fibre.

The first processor may be arranged to determine the location of a temperature variation along the length of the optical fibre.

Impedance variation may be indicative of an Earth fault along the metal tube.

There is further disclosed a pipeline apparatus comprising: a flexible pipe body including an optical fibre extending at least partially along the length of the flexible pipe body, the optical fibre being encased in a metal tube; an end fitting coupled to at least one end of the pipe body; and a detection apparatus as described above coupled to the end fitting; wherein the optical sensor is coupled to a first end of the optical fibre and the electrical sensor is coupled to a first end of the metal tube.

The metal tube may be positioned within an annulus of the flexible pipe body between an innermost barrier layer and an outermost barrier layer.

The metal tube may be electrically isolated from metal pipe body structural components within the annulus and the end fitting is constructed such that the metal tube can pass through the end fitting while remaining electrically isolated.

The end fitting or a portion of the metal pipe body structural components may comprise the separate terminal coupled to the electrical meter.

The metal tube may be received within a sheath apparatus extending along at least part of the flexible pipe body to electrically isolate the metal tube, the sheath comprising an elongate body portion, comprising an outer surface and a channel for receiving the metal tube, and further comprising at least one opening connecting the channel and the outer surface.

The pipeline apparatus may comprise two or more flexible pipe bodies, each having an optical fibre encased in a metal tube extending at least partially along its length; wherein the pipeline apparatus may further comprises an optical multiplexer and the optical sensor is coupled to each optical fibre through the multiplexer such that the optical multiplexer is arranged to detect scattered or reflected light within a single optical fibre at a time; and wherein the electrical sensor may be arranged to couple to a first end of each metal tube in turn to detect variation of an electrical impedance between a first end of the metal tube and a separate terminal, or the pipeline apparatus further comprises two or more electrical meters arranged to couple to a first end of a respective metal tube to detect variation of an electrical impedance between the first end of the respective metal tube and a separate terminal.

There is further disclosed a method of detecting defects within a flexible pipe body, the method comprising: injecting optical pulses into a first end of an optical fibre extending at least partially along the length of a flexible pipe body, the optical fibre being encased in a metal tube; detecting scattered or reflected light; detecting variation of an electrical impedance between the first end of the metal tube and a separate terminal; wherein variation of the scattered or reflected light, or impedance variation, is indicative of a potential pipe body defect.

There is further disclosed a method of forming a pipeline apparatus, the method comprising: providing a flexible pipe body including an optical fibre extending at least partially along the length of a flexible pipe body, the optical fibre being encased in a metal tube; coupling an end fitting to at least one end of the pipe body; and coupling a detection apparatus as described above to the end fitting; wherein the method further comprises: injecting optical pulses into a first end of the optical fibre using the optical sensor ; detecting scattered or reflected light; and detecting variation of an electrical impedance between a first end of the metal tube and a separate terminal using the electrical sensor ; wherein variation of the scattered or reflected light, or impedance variation, is indicative of a potential pipe body defect The pipe may be for high pressure use in oil and gas extraction.

BRIEF DESCRIPTION OF THE DRAWINGS

Embodiments of the invention are further described hereinafter with reference to the accompanying drawings, in which.

In the drawings like reference numerals refer to like parts.

DETAILED DESCRIPTION

Figure 1:
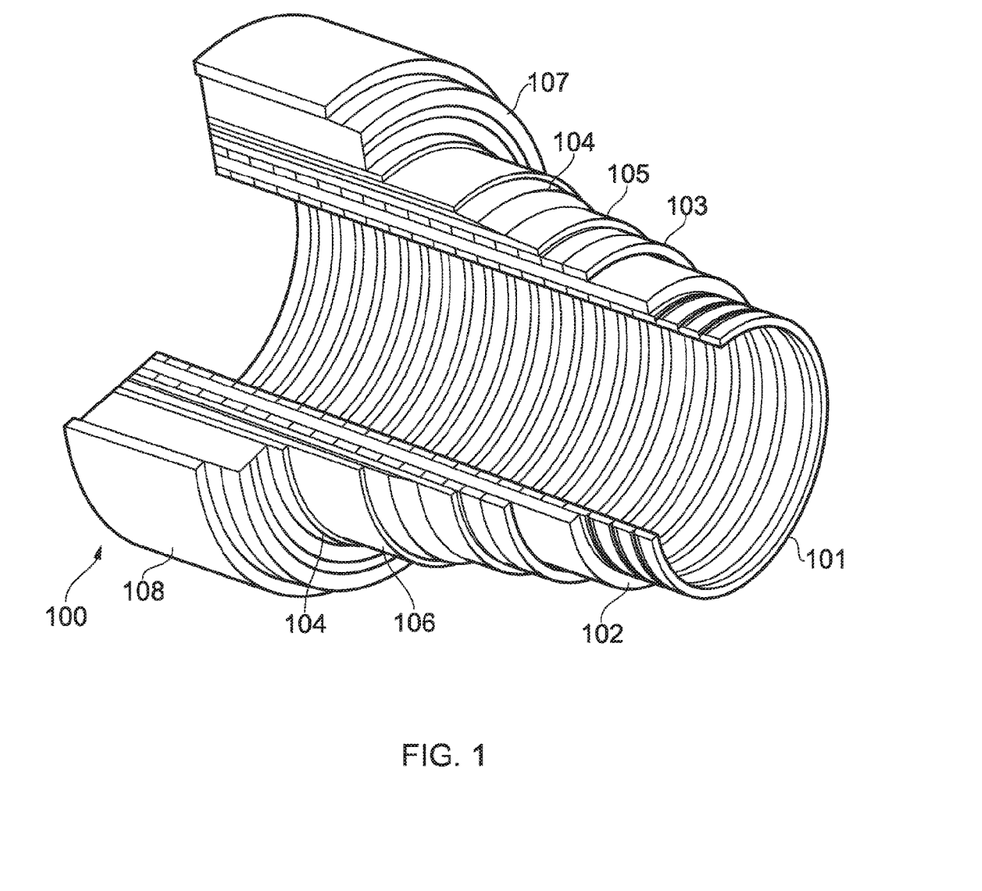
FIG. 1 illustrates a flexible pipe body.

Throughout this description, reference will be made to a flexible pipe. It will be understood that a flexible pipe is an assembly of a portion of a flexible pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer with a lay angle close to 90° that increases the resistance of the flexible pipe to internal and external pressure and mechanical crushing loads. The layer also structurally supports the internal pressure sheath, and typically consists of an interlocked construction.

The flexible pipe body also includes an optional first tensile armour layer 105 and optional second tensile armour layer 106. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of flexible pipe body 100 together with an end fitting located at one end or both ends of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
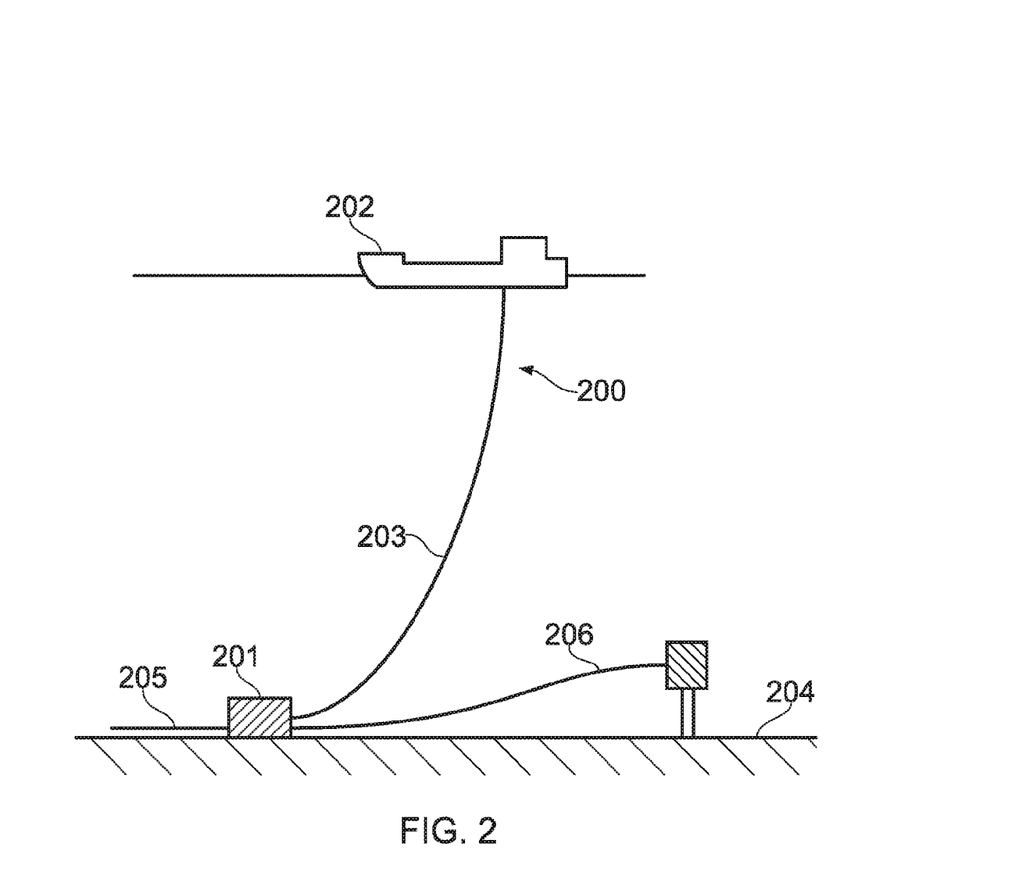
FIG. 2 illustrates a riser assembly incorporating a flexible pipe body.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line 205. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings. FIG. 2 also illustrates how portions of flexible pipe can be utilised as a flow line 205 or jumper 206. It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

There is an increasing desire for the continual monitoring of various parameters of flexible pipes, such as strain, temperature and acoustics, to help detect structural failures in the pipe. Such structural failure could be leakage, wire breakage, over-bending in the pipe (i.e. bending past the maximum allowable amount before which damage will occur), and interaction between the pipe and external environment such as collisions with other objects, for example.

One way which has been suggested for monitoring parameters associated with such structures is the use of an optical fibre system. As a method of monitoring strain, temperature and acoustics in flexible pipe, bare fibres and/or Fibre In Metal Tubes (FIMT) within a protective conduit have been incorporated along the length of the pipe structure and connected to an interrogating device external of the pipe. The fibre is used as an optical fibre for transmitting light and is generally made of glass. The optical fibres can be used, for instance, as strain gauges, temperature gauges and temperature indicators. Temperature or strain measurements can be made which are localised, distributed or semi-distributed depending upon the manner in which the optical fibre is interrogated and regions/sensors in the optical fibre are arranged. The fibres may include Bragg Gratings whereby differential diffraction of light passing down the fibre is used to measure the necessary parameter. Output readings can be analysed to determine the conditions of the pipe over a time period and corrective action can be taken accordingly. WO2009/068907 discloses a way in which an optical fibre can be wrapped around a flexible pipe and certain measurements taken from which parameters associated with the pipe can be determined.

Strain can be monitored by including a FIMT that is bonded to the conduit. Temperature can be monitored by including a FIMT that is not bonded to the inside of the conduit, and is therefore able to record temperature independently to strain. Fibres can be configured in a similar manner to monitor acoustic conditions.

As noted above, defects in a flexible pipe body can compromise the structural integrity of the pipe body. In particular, a breach or rupture of an outer seawater resistant layer can allow seawater ingress into the pipe body annulus between an innermost barrier layer and the outer seawater resistant layer. Alternatively, a breach in an innermost barrier layer can permit production fluids to enter the pipe body annulus. With reference to FIG. 1 the outer seawater resistant layer may comprise the polymer outer sheath 108 and the innermost barrier layer may comprise the internal pressure sheath 102. The pipe body annulus is occupied by metal structural components such as the tensile armour layers 105, 106 of FIG. 1. Such components are frequently formed from steel or other metals and are susceptible to rapid corrosion in the presence of seawater.

The ingress of fluids, whether seawater or production fluids, can cause the temperature of the pipe body annulus to change. It is known to monitor flexible pipe bodies to detect changes of temperature which may indicate a defect that requires further investigation. One such known approach using an optical fibre system of the type described above is called Distributed Temperature Sensing (DTS). Advantageously, DTS allows temperature changes to be detected and located along a flexible pipe body through monitoring an optical fibre that extends along the flexible pipe body. In some forms of DTS, an absolute temperature profile can be established along the optical fibre (and hence along the flexible pipe body) as well as detecting transient changes in temperature. The use of DTS is particularly attractive for use in the oil and gas industry as it does not require the use of electronics or the passage of electrical signals within the flexible pipe body. Indeed the only electronics comprise the detection instrumentation coupled to an end of the optical fibre, and which may be positioned at one end of the flexible pipe body outside of the pipe body annulus.

DTS works by transmitting short duration pulses of light along the optical fibre and monitoring for the return of reflected light. The light pulses interact with the crystal lattice of the glass fibre and the frequency shift of backscattered light is dependent upon the temperature of the glass. The time at which each portion of the returned light arrives, relative to the time of the transmitted pulses, can be used to determine the location along the fibre from which the light is scattered. A temperature profile along the length of the fibre can be established. It is assumed that the skilled person will be familiar with the details of conventional DTS.

DTS systems for measuring and monitoring temperature profiles along optical fibres are commercially available and well used in the oil and gas industry. Typically, a DTS system can locate a temperature measurement to a spatial resolution of 1 m, and with an accuracy of 1 ° C. A single DTS system may monitor an optical fibre extending along a pipeline for up to 30 km. However, a disadvantage of current DTS systems is that they are expensive and typically can only monitor a single optical fibre at any one time. A DTS system comprises an optical reflectometer coupled to an optical fibre, together with associated power supply and monitoring equipment. This may either comprise Optical Time Domain Reflectormetry (OTDR) or Optical Frequency Domain Reflectometry (OFDR).

It is known for DTS systems to provide the optical fibre as a Fibre In Metal Tube (FIMT) to protect the optical fibre. The optical fibre is encapsulated within a sealed metal tube, which advantageously protects the optical fibre from physical damage, changes in pressure, damage due to very high temperatures and the effects of corrosive environments, all of which may occur when DTS is used to detect changes in temperature within a flexible pipe body annulus. Typically, the metal tube is formed from stainless steel, with an outside diameter of less than 7 mm and aptly with an outside diameter approximately equivalent to the thickness of the wires in the flexible pipe body layer into which it is fitted. Aptly the outside diameter of the metal tube may be smaller than the thickness of the wires in the flexible pipe body layer into which it is fitted so that the tube may be installed in a sheath apparatus or carrier tape. Multiple optical fibres may be provided within a single metal tube, which may be desirable in certain deployment scenarios, though for DTS frequently a single fibre will suffice. The fibre may be inserted into the metal tube for instance by pumping a liquid through the tube to draw the fibre through. The space within the metal tube surrounding the fibre may be filled with a protective material, for instance a gel, to further protect the fibre, including protection from the effects of bending, and to minimise the transmission of force to fibre during manufacturing and deployment of the FIMT. Additionally, the length of the fibre inserted into the tube may exceed the length of the tube to prevent damage during thermal expansion and contraction of the metal tube.

While DTS is a well-established technology that has been accepted by the oil and gas industry for detecting pipe defects through the associated changes in temperature, the expense of the associated optical reflectometry equipment can make it uneconomic to use DTS for a large number of pipe assemblies. Furthermore, the fact that certain DTS systems can only detect transient changes in temperature is undesirable because if the initial temperature change at the start of a pipe breach is missed the DTS system may subsequently provide no indication of an on-going breach.

Figure 3:
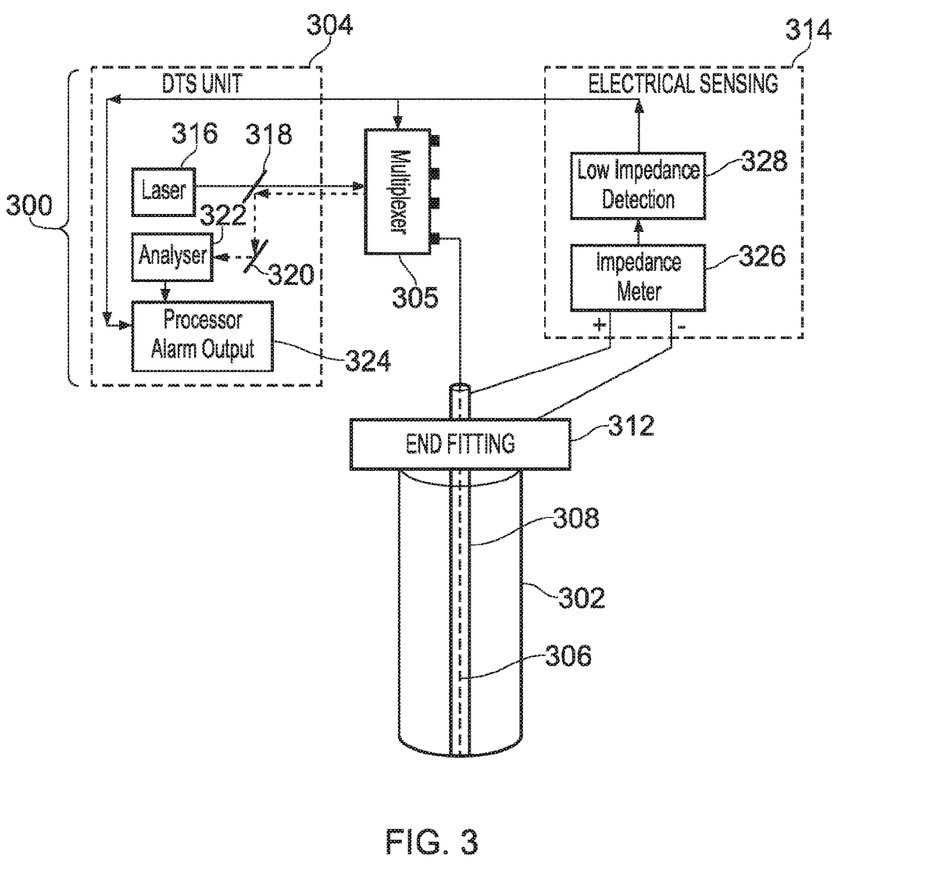
FIG. 3 illustrates a detection apparatus according to an embodiment of the present invention coupled to a flexible pipe body which is terminated with an explosive atmosphere (ATEX) approved end fitting.

There will now be described embodiments of the present invention which can detect a breach of an outer or an inner resistant layer of a flexible pipe body. FIG. 3 illustrates a detection apparatus 300 in accordance with a first embodiment of the present invention coupled to a flexible pipe body 302, which may be of the type shown in FIG. 1. The detection apparatus 300 is arranged to detect a change to the flexible pipe body 302 which may indicate a defect (and in particular, a breach allowing seawater or other fluids into the pipe body annulus). The detection apparatus 300 may be coupled to a warning system arranged to provide an output signal to an operator of the flexible pipe alerting the operator to potential damage to the pipe. The output signal may, for instance, be a visual or audible alarm.

The detection apparatus 300 comprises an optical sensor 304 arranged to couple to a first end of an optical fibre 306 (indicated by the dotted line extending at least partially along the length of the flexible pipe body 302. The optical sensor 304 may comprise a DTS unit of the type described above. The optical sensor 304 may comprise an optical reflectometer. FIG. 3 shows the optical sensor coupled to the optical fibre 306 through a multiplexer 305. The multiplexer 305 may alternatively be considered to be part of the optical sensor 304. The multiplexer allows a single optical sensor to be coupled to multiple optical fibres 306, as will be described below in connection with FIG. 6.

The optical fibre 306 extends through at least the portion of the flexible pipe body 302 within which it is desired to detect potential pipe body defects. The optical fibre 306 is encased in a metal tube 308 to form a Fibre In Metal Tube (FIMT) of the type discussed above for conventional DTS systems. Preferably, the metal tube 308 extends along the whole length of the optical fibre 306, at least along that portion of the optical fibre 306 within the flexible pipe body 302. The metal tube 308 is electrically isolated from surrounding metallic structural components within the pipe body annulus. One mechanism by which the electrical isolation may be achieved is described below in connection with FIG. 5. The FIMT may be positioned within the pipe body annulus (for instance between layers 101 and 108 shown in FIG. 1. FIG. 3 shows the flexible pipe body 302 being terminated with an end fitting 312. The end fitting 312 may be an explosive atmosphere (ATEX) approved end fitting, which is electrically coupled to metallic structural components within the pipe body annulus and connects those components to Earth. The FIMT passes through the end fitting 312 through a gland arrangement as described below in connection with FIG. 4 such that the metal tube 308 remains electrically isolated along its whole length within the pipe body annulus.

The optical sensor 304 is arranged to inject optical pulses into the optical fibre 306 and to detect scattered or reflected light. FIG. 3 shows details of the optical sensor 304 in accordance with one embodiment that will be familiar to the person skilled in the art. Specifically, the optical sensor 304 comprises a laser 316 arranged to generate pulses of light for injection into the optical fibre 306. The light pulses pass through a partially reflecting mirror 318 and through the multiplexer 305 to reach the optical fibre 306. Scattered or reflected returned light passes through the multiplexer 305 before being deviated from the original light path by partially reflecting mirror 318. The returned light is then reflected by a second mirror 320 towards an analyser 322. The analyser 322 is arranged to compare the transmitted light pulses and the returned light to provide a temperature profile along the length of the optical fibre 306, as described above in connection with conventional DTS techniques. A processor 324 is arranged to provide an alarm output if a change in temperature is detected occurring along the length of the optical fibre 306 which may be indicative of a change in temperature induced by ingress of fluid into the pipe body annulus.

The detection apparatus 300 further comprises an electrical sensor 314 arranged to couple to a first end of the metal tube 308. The electrical sensor 314 is arranged to detect variation of electrical impedance between the first end of the metal tube and a separate terminal. Aptly the metal tube 308 is electrically isolated from the surrounding steelwork by the use of spacers or the extrusion shown in in FIG. 5. For instance, the metal tube 308 may be electrically isolated from other metal components within the pipe body annulus, and in particular metal structural components of the type described above in connection with FIG. 1. The electrical isolation of the metal tube 308 is be maintained where the FIMT passes through the end fitting body 312, as will be described below in connection with FIG. 4.

The electrical sensor 314 in the embodiment of FIG. 3 comprises an impedance meter 326 arranged to measure the impedance between the metal tube 308 and the metal structural components of the pipe body 302. Aptly the impedance meter 326 may be coupled between the metal tube 308 and the end fitting 312, as shown. As noted above the end fitting 312 is electrically coupled to metal structural components within the pipe body annulus, and in certain embodiments may be connected to Earth. In the absence of a breach, the impedance measured by the impedance meter 326 between the metal tube 308 and the end fitting 312 is high. If a breach permits the ingress of fluid into the pipe body annulus then fluid may electrically couple the metal tube 308 to the metal components causing an electrical short circuit. The impedance meter 326 would then measure a drop in impedance. The electrical sensor 314 further comprises a low impedance detection circuit 328 that is coupled to the impedance meter 326 and arranged to detect a drop in the measured impedance, and may for instance be arranged to detect a change in impedance greater than a preset threshold. In certain embodiments, if the low impedance detection circuit 328 detects a drop in impedance, then a signal is sent to the processor 324, which may trigger an alarm output. In certain embodiments, discussed in greater detail below in connection with FIG. 6, if a drop in impedance is detected then a signal may be sent to the multiplexer 305 to couple the optical sensor 304 to a particular pipe showing the drop in impedance. This allows the presence of a potential pipe body defect indicated by the drop in impedance to be confirmed by the optical sensor.

In other embodiments, the separate terminal may comprise a seawater terminal such that the impedance measurement is between the metal tube 308 and seawater surrounding a subsea flexible pipe assembly. In the event of a seawater breach the seawater within the pipe body annulus may electrically couple the metal tube to the seawater electrode.

For the detection apparatus 300 of FIG. 3 variation of the scattered or reflected light, or impedance variation, is indicative of a potential pipe body defect. In particular, if a drop in the measured impedance is detected, this is indicative of a potential pipe body defect that has cause fluid ingress into the pipe body annulus somewhere along the length of the FIMT. The optical sensor 304 may be able to determine a location of a temperature variation (indicative of a potential pipe body defect) along the length of the optical fibre.

Advantageously, the detection apparatus 300 in combination with the FIMT 306, 308 forms a dual sensor system to detect potential pipe body defects for further investigation along the length of a flexible pipe body. The provision of a dual sensor system in this may increase the reliability of pipe defect detection as the detection mechanisms and apparatus are independent of one another and complementary. The electrical sensor is able to provide a rapid indication of a pipe breach event that has permitted seawater of production fluid ingress into the pipe body annulus, and thus triggered an electrical short circuit detectable by the electrical meter 314. This rapid indication of a pipe breach event may be used to trigger an early inspection of the pipe to determine the location of a defect. Alternatively a different form of electrical sensor may be provided in which the metal tube is one component, and which is able to independently provide an indication of the location of the defect. It will be appreciated that this may require the provision of further electrical components extending through the pipe body annulus, and it is not further described herein except to note that metal tube 308 would then form one component of an electrical circuit. As a further alternative, in the event that the electrical system detects a pipe breach event, the optical sensor may be interrogated to determine the location of the pipe breach. That is, when a breach is detected the sensor may prioritise temperature sensing (if the DTS system is in use the majority of the time for sensing other parameters of the flexible pipe body). This interrogation may comprise examination of a current temperature profile along the length of the optical fibre to determine the location of a temperature anomaly. Alternatively, the interrogation may comprise examination of previous measurements to determine the location of a transient temperature change event indicative of a pipe body defect. The skilled person will appreciate that there are a wide range of commercially available DTS systems and the form of interrogation will vary according to the type of measurements performed by the DTS system.

Alternatively, or additionally, the optical sensor may independently provide an indication of a temperature change event indicate of a pipe breach event. It will be appreciated that the optical sensor may also be able to detect other forms of pipe body changes, such as bending or crushing, which have not yet resulted in a pipe breach detectable by the electrical system.

Figure 4:
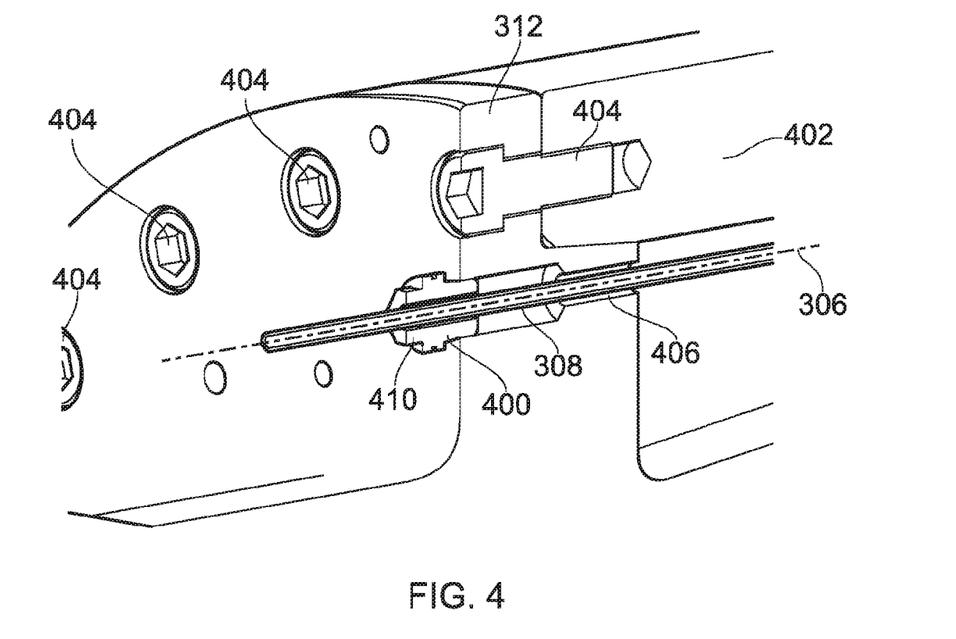
FIG. 4 illustrates a gland arrangement enabling a Fibre in Metal Tube (FIMT) within a pipe body annulus to pass through an ATEX approved pipe body end fitting such that the metal tube remains electrically isolated in accordance with an embodiment of the present invention.

Referring now to FIG. 4, this illustrates an insulated gland assembly 400 arranged to permit the FIMT 306, 308 to pass through the end fitting body 312. FIG. 4 shows a pipe body end fitting jacket 402 and end fitting body 312, between which the tensile armour wires (not illustrated) are secured. The end fitting jacket 402 forms an annular ring, one part of which is shown in cross section in FIG. 4. At a head end of a flexible pipe assembly an end fitting body 312 (shown partly in cross section) is secured to the jacket 402 through a plurality of bolts 404 (one shown in cross section). The end fitting jacket 402 in combination with the end fitting body 312 is arranged to electrically connect all of the metal structural components within the pipe body.

As will be further described below, the FIMT 306, 308 is electrically isolated within the pipe body annulus. It will be appreciated that it must also be electrically isolated as it passes through the end fitting body 312. The FIMT 306, 308 passes through a bore 406 within the end fitting body 312. At one end of the bore 406 there is positioned a first gland 410 which is formed from an electrically insulating material, and serves to space the FIMT 306, 308 from the end fitting body 312. Similarly, at the other end of the bore 406 there may be provided a second gland (not shown) which is formed from an electrically insulating material. The first gland 410 comprises an electrically isolated high pressure subsea connector.

In certain embodiments of the invention the insulated gland assembly could house one or more sensors or cables in addition to the FIMT 306, 308 to permit access to the flexible pipe body annulus.

To electrically insulate the FIMT 306, 308 within the pipe body annulus the FIMT may extend between adjacent tensile armour wires and be insulated from adjacent wires by a band of polymeric material, or another form of electrical separator. Insulation from adjacent armour wire layers may be provided by tape between each layer. Alternatively, a sheath apparatus 500 may be provided as shown in FIG. 5.

Figure 5:
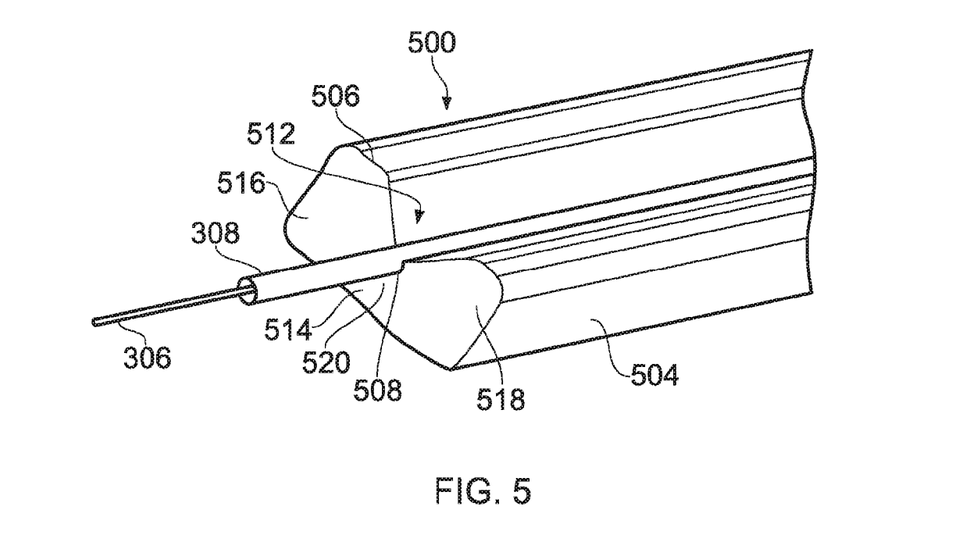
FIG. 5 illustrates a FIMT supported by a polymer extrusion in accordance with an embodiment of the present invention.

FIG. 5 illustrates a sheath apparatus 500 for housing the FIMT 306, 308. The sheath apparatus 500 is an elongate member formed from an extruded or injection moulded polymer (for example HDPE) in this embodiment. More specifically, the sheath 500 includes a body portion 504, having an outer surface 506. The body portion 504 is approximately rectangular in cross-section, with some particular modifications described below, and has a substantially constant cross-section (i.e. a prism). The body portion may be formed from a polymer or composite material The sheath apparatus 500 has overall dimensions (width, length and depth) substantially similar or equal to the overall dimensions of a tensile armour wire of a flexible pipe body. Then, the sheath 500 housing the tube or cable may be used to replace a tensile armour wire when forming a flexible pipe body. Alternatively, the sheath apparatus may be introduced in a space between adjacent armour wires of a flexible pipe body.

The body portion 504 includes a channel 508 for receiving the FIMT 306, 308 within the body portion. The channel 508 extends continuously along the body portion and defines an inner surface 510 of the body portion, approximately semi-circular in cross-section, or somewhat more circular than semi-circular (i.e. between circular and semi-circular), for contacting the FIMT and holding the FIMT in position. The FIMT and the sheath apparatus 500 may be manufactured together as a unit, or the sheath may be manufactured separately to the FIMT, and the FIMT inserted into the channel 508.

The channel 508 is not entirely enclosed by the body portion 504. Rather, in this embodiment, the channel 508 is exposed by an opening 312 that connects the channel with the outer surface 506. The opening ensure that fluid within the pipe body annulus comes into contact with the metal tube 308. The opening also extends continuously along the elongate body portion. The body portion 504 is approximately triangular in cross-sectional shape, with a narrower section close to the channel, extending to become wider close to the outer surface 506. This arrangement may assist in enabling a FIMT to be readily inserted into the channel during production.

By providing the channel 508 and opening 512, the body portion 504 effectively has a cross-sectional shape having a base portion 314, first and second lobes 516, 518 extending from the base portion 514, and a central portion 520 of the base portion between the first and second lobes, where the central portion extends less than the lobes. It will be appreciated that bores may be provided within lobes 516, 518 in order to receive further cables or FIMTs for monitoring or control purposes unrelated to the present invention.

Figure 6:
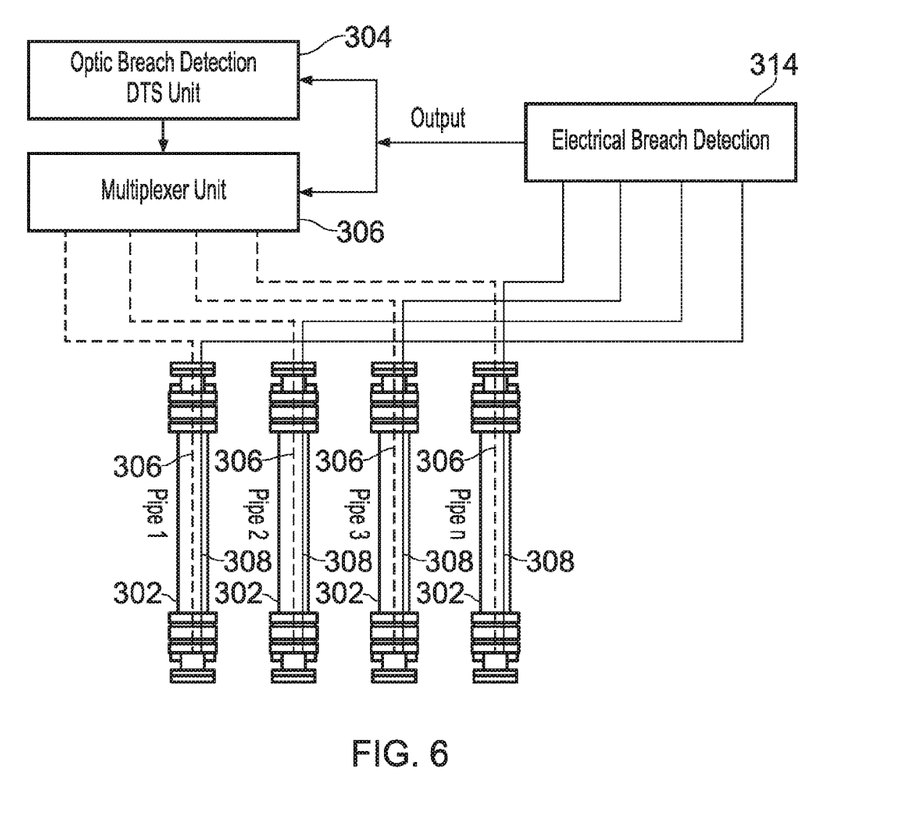
FIG. 6 illustrates a system for monitoring multiple flexible pipe bodies in accordance with an embodiment of the present invention.

The detection system 300 shown in FIG. 3 is intended to monitor a single flexible pipe body or pipe assembly to detect a potential defect (in which case the multiplexer 305 may be omitted). In the event that it is required to monitor multiple pipe assemblies to detect potential defects, in accordance with one embodiment of the invention multiple sets of detection apparatuses may be provided with one allocated to each pipe assembly. However, the cost of an optical sensor 304, for example a DTS unit, may be relatively high, at least in comparison to the electrical sensor 314. Consequently, in accordance with a further embodiment of the invention illustrated in FIG. 6 there may be only a single optical sensor 304 and a single electrical sensor 314, comprising one or more impedance meters 326 to monitor a plurality of flexible pipe bodies 302 (four are shown in FIG. 6). A separate FIMT 306, 308 is provided within the pipe body annulus of each pipe body 302 as described above in connection with FIG. 6.

Each metal tube 308 is coupled directly to the electrical sensor 314. The electrical sensor 314 may comprise a separate impedance meter 326 arranged to monitor for a change of impedance between each metal tube 308 and a separate terminal, or there may be a single impedance meter 326 arranged to monitor each pipe body in turn on a rotation system. The impedance for each pipe body may be measured between the respective metal tube 308 and a separate terminal unique to each pipe body (for instance the metal structure of the pipe body) or a common separate terminal may be provided for all of the pipe bodies. Conversely, each fibre optic 306 is coupled via a multiplexer unit 305 to a single optical sensor 304 which is able to monitor only a single optical fibre 306 at any one time. The electrical sensor 314 is arranged to continuously monitor each of the pipe bodies for a breach event. In the event of a breach being detected a control signal is sent to the optical sensor 304 and the multiplexer 305 instructing which optical fibre is to be monitored to locate the position of the breach by, for instance, detecting an anomaly in the temperature profile along that optical fibre. In the absence of a breach condition the optical sensor 304 may be used to perform other monitoring, for instance measuring strain along the optical fibres in turn, which may itself provide an early indication of a possible forthcoming breach event.

Advantageously, the electrical sensor 314 is not temperature sensitive. This means that if used to form the initial determination whether or not there has been a breach, this reduces the risk of false-positive detection of a breach relative to using the optical sensor 304 when used in applications where the temperature differential is low, for example for water injection pipes, or unpredictable due to splash or tidal zones. Additionally, if the optical sensor 304 is able to detect only a change in temperature and not measure an absolute temperature profile along the length of the optical fibre then if the initial breach event is missed by the optical sensor 304, once the temperature within the pipe body annulus has stabilised, it is no longer possible to detect that a breach event has occurred.

Figure 7:
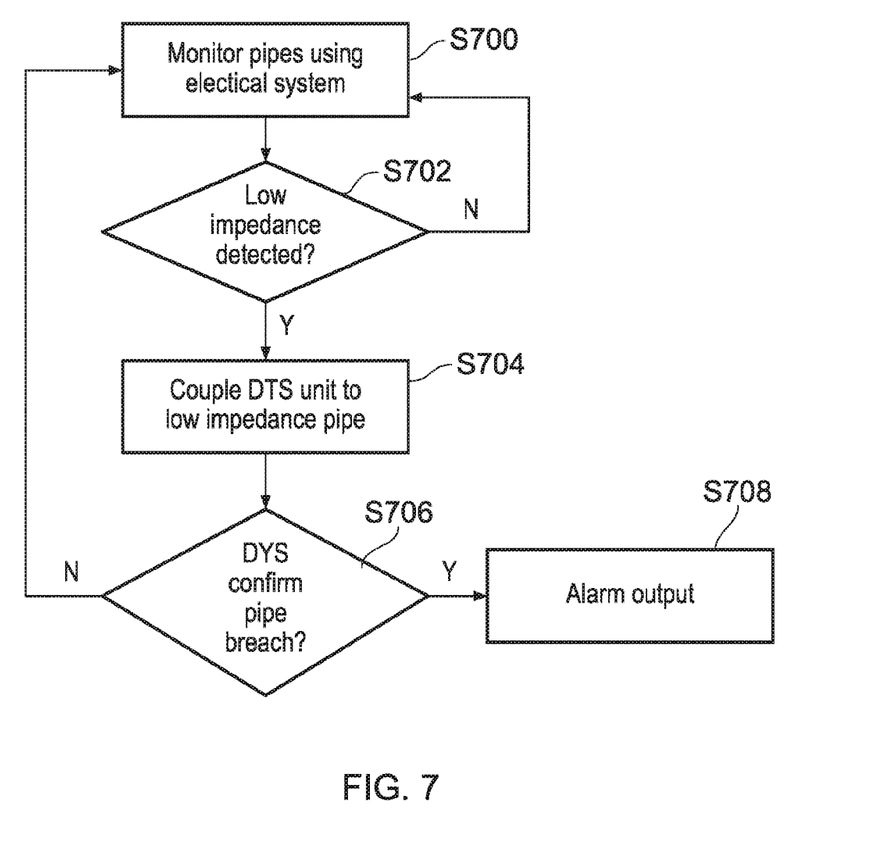
FIG. 7 is a flowchart illustrating a method of detecting a potential pipe body defect in accordance with an embodiment of the present invention.

Referring now to FIG. 7, this illustrates in the form of a flowchart a method of detecting a potential pipe body defect using the system of FIG. 6. At step S700 the electrical sensor 314 monitors all of the pipe bodies for a change in impedance. The monitoring may be continuous if a separate impedance meter 326 is provided for each pipe body or discontinuous in the event that a single impedance meter 326 is connected to each pipe body in turn. At step S702 the low impedance detection circuit 328 determines if a change in impedance has been detected for one of the pipe bodies. If there is no change in impedance then the process returns to step S700. If a change in impedance is detected then the process passes to step S704 at which point the optical sensor 304 is connected to the appropriate pipe by controlling the multiplexer 305. The optical sensor 304 is configured to detect the presence of a change in temperature indicative of a potential pipe body defect, and optionally to determine its location. At step S706 the processor 324 determines if a potential pipe body defect has been determined, and if so an alarm is output at step S708. Otherwise the process returns to step S700.

With the above-described arrangement defects including breaches of an outer seawater resistant layer of a pipe body can be detected in a timely manner, allowing further inspection, and if necessary maintenance, to take place.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A pipeline apparatus comprising:
a flexible pipe body including an optical fibre extending at least partially along the length of the flexible pipe body, the optical fibre being encased in a metal tube; and
a detection apparatus, the detection apparatus comprising:
an optical sensor coupled to a first end of the optical fibre, the optical sensor being arranged to inject optical pulses into the optical fibre and to detect scattered or reflected light; and
an electrical sensor coupled to a first end of the metal tube and to detect variation of an electrical impedance between the first end of the metal tube and a separate terminal;
wherein variation of the scattered or reflected light, or impedance variation, is indicative of a potential pipe body defect;
wherein the metal tube is positioned within an annulus of the flexible pipe body between an innermost barrier layer and an outermost barrier layer.

2. A pipeline apparatus according to claim 1, wherein variation of scattered of reflected light is indicative of a temperature variation along at least part of the length of the optical fibre.

3. A pipeline apparatus according to claim 2, further comprising a first processor coupled to the optical sensor and arranged to process the scattered or reflected light to calculate a temperature profile along the length of the optical fibre.

4. A pipeline apparatus according to claim 3, wherein the first processor is arranged to determine a location of a temperature variation along the length of the optical fibre.

5. A pipeline apparatus according to claim 1, wherein impedance variation is indicative of an Earth fault along the metal tube.

6. A pipeline apparatus according to claim 1, further comprising an end fitting coupled to an end of the pipe body; wherein the metal tube is electrically isolated from metal pipe body structural components within the annulus and the end fitting is constructed such that the metal tube can pass through the end fitting while remaining electrically isolated.

7. A pipeline apparatus according to claim 6, wherein the end fitting or a portion of the metal pipe body structural components comprise the separate terminal coupled to the electrical sensor.

8. A pipeline apparatus according to claim 6, wherein the metal tube is received within a sheath apparatus extending along at least part of the flexible pipe body to electrically isolate the metal tube, the sheath comprising an elongate body portion, comprising an outer surface and a channel for receiving the metal tube, and further comprising at least one opening connecting the channel and the outer surface.

9. A pipeline apparatus comprising:
a flexible pipe body including an optical fibre extending at least partially along the length of the flexible pipe body, the optical fibre being encased in a metal tube; and
a detection apparatus, the detection apparatus comprising:

an optical sensor coupled to a first end of the optical fibre, the optical sensor being arranged to inject optical pulses into the optical fibre and to detect scattered or reflected light; and an electrical sensor coupled to a first end of the metal tube and to detect variation of an electrical impedance between the first end of the metal tube and a separate terminal;

wherein variation of the scattered or reflected light, or impedance variation, is indicative of a potential pipe body defect;

wherein the pipeline apparatus comprises two or more flexible pipe bodies, each having an optical fibre encased in a metal tube extending at least partially along its length;

wherein the pipeline apparatus further comprises an optical multiplexer and the optical sensor is coupled to each optical fibre through the optical multiplexer such that the optical multiplexer is arranged to detect scattered or reflected light within a single optical fibre at a time; and wherein the electrical sensor is arranged to couple to a first end of each metal tube in turn to detect variation of an electrical impedance between a first end of the metal tube and a separate terminal, or the pipeline apparatus further comprises two or more electrical meters arranged to couple to a first end of a respective metal tube to detect variation of an electrical impedance between the first end of the respective metal tube and a separate terminal.

10. A method of detecting defects within a flexible pipe body, the method comprising:

injecting optical pulses into a first end of an optical fibre extending at least partially along the length of a flexible pipe body, the optical fibre being encased in a metal tube, wherein the metal tube is positioned within an annulus of the flexible pipe body between an innermost barrier layer and an outermost barrier layer;

detecting scattered or reflected light;

detecting variation of an electrical impedance between the first end of the metal tube and a separate terminal;

wherein variation of the scattered or reflected light, or impedance variation, is indicative of a potential pipe body defect.

11. A method of forming a pipeline apparatus, the method comprising:

providing a flexible pipe body including an optical fibre extending at least partially along the length of the flexible pipe body, the optical fibre being encased in a metal tube, wherein the metal tube is positioned within an annulus of the flexible pipe body between an innermost barrier layer and an outermost barrier layer; and coupling an optical sensor to a first end of the optical fibre; and coupling an electrical sensor to a first end of the metal tube;

wherein the optical sensor is arranged to inject optical pulses into the optical fibre and to detect scattered or reflected light and the electrical sensor is arranged to detect variation of an electrical impedance between the first end of the metal tube and a separate terminal; and wherein variation of the scattered or reflected light, or impedance variation, is indicative of a potential pipe body defect.

\* \* \* \* \*